United States Patent [19]
Ambs

[11] Patent Number: 5,969,297
[45] Date of Patent: Oct. 19, 1999

[54] PULSE GENERATOR POWERED VIBRATOR

[75] Inventor: Loran D. Ambs, Fulshear, Tex.

[73] Assignee: Western Atlas International, Inc., Houston, Tex.

[21] Appl. No.: 09/014,350

[22] Filed: Jan. 27, 1998

[51] Int. Cl.⁶ .................................................. G01V 1/02
[52] U.S. Cl. ........................... 181/113; 181/114; 181/121
[58] Field of Search ..................................... 181/101, 102, 181/104, 105, 106, 108, 111, 112, 113, 114, 121, 122; 367/25, 912

[56] References Cited

U.S. PATENT DOCUMENTS

| | | | |
|---|---|---|---|
| 4,850,449 | 7/1989 | Cheung | 181/101 |
| 5,327,399 | 7/1994 | Asada et al. | 181/121 |

*Primary Examiner*—Khanh Dang
*Attorney, Agent, or Firm*—Alan J. Atkinson; J. Albert Riddle

[57] ABSTRACT

An apparatus for generating signals and energy for transmission to a large mass. The apparatus incorporates a pulsed generator such as a compensated pulsed alternator for storing and for discharging large amounts of energy in a controlled manner for transmission through a vibrator or similar electromechanical device. In the field of seismic exploration, the apparatus discharges seismic source energy into a land mass or water to generate seismic waves which are reflected from the interface between subsurface geologic formations. The pulsed generator permits the seismic source energy to be discharged in a controlled manner to shape the energy signal, and permits large quantities of energy to be discharged to increase the penetration depth and strength of the reflected signals.

18 Claims, 1 Drawing Sheet

PULSE GENERATOR POWERED VIBRATOR

BACKGROUND OF THE INVENTION

The present invention relates to the field of signal generation through vibration of a large mass. More particularly, the invention relates to a seismic exploration device for storing large quantities of energy and for selectively discharging such energy to vibrate a large mass.

Seismic exploration methods indicate the physical properties and spatial disposition of geologic formations underlying the earth surface. In land based seismic systems, mechanical vibrators or explosive charges initiate a pressure wave in earth materials. In marine systems, a seismic source array comprising air guns or other pressure source wave generators are towed by a vessel through the water. Source waves from a seismic source travel downwardly through the subsurface formations, and portions of the seismic wave energy are reflected, refracted and transmitted by geologic interfaces between subsurface geologic units. The returning reflected waves are detected by a sensor or sensor arrays located at a known position relative to the energy source.

Seismic sensors in land based or marine systems comprise transducers which convert pressure, velocity and acceleration into electric signals. The output signals are recorded and processed to indicate mechanical, acoustic and structure characteristics of geologic units. For example, the propagation time of a seismic wave reflected from a point is proportional to the depth of the reflection point. Travel times from multiple, spatially diverse source and receiver pairs facilitate construction of maps representing the spatial disposition of subsurface geologic units.

Seismic source energy can be provided by explosive charges such as dynamite or other explosive compounds. In U.S. Pat. No. 4,324,310 to Wener et al. (1982), a high resolution seismic data acquisition system used an electronically fired shotgun source. One disadvantage of explosive charges are that they are typically self destructive and cannot be used multiple times. Explosive charges also present a multitude of handling and storage problems, can destroy natural and anthropogenic structures, and can destroy plant and animal life.

Conventional land based seismic vibrators transmit vibration energy to the earth land mass over a period of time. Seismic vibrators are typically driven by an oscillating hydraulic piston engaged to a stiff plate in contact with the ground. The hydraulic cylinder is also engaged with a substantial reaction mass. When hydraulic pressure is applied to the piston within the cylinder, opposing forces are applied to the reaction mass and the baseplate. The force applied to the baseplate is transmitted into the earth as pressure waves or shear waves into the earth material contacted. The duration and strength of waves introduced into the earth depends upon the amount of energy available to drive the pump, capacity of the hydraulic pump, characteristics of the storage device, and mechanical efficiency of the system. The hydraulic cylinder is powered by a hydraulic pump typically driven by an internal combustion engine. An electronically actuated valve system controls the flow of hydraulic fluid to the hydraulic cylinder and is capable of varying the pressure as a function of time. It is also possible to store hydraulic energy by compressing a gas with hydraulic oil in an accumulator or other pressure vessel.

Vibratory seismic sources impart energy into the land mass and water over a period of time at typically lower energy levels than explosive systems. A variety of mechanisms have been employed to produce vibratory seismic source signals. U.S. Pat. No. 4,692,672 to Okuno (1987) disclosed a vibration wave motor which applied a periodic voltage to an electro-restrictive element. The speed of the movable member was reduced without reducing the amplitude of the periodic voltage, a synchronizing pulse generator produced a rectangular pulse, and this pulse was subsequently modulated and amplified.

U.S. Pat. No. 4,734,894 to Cannelli et al. (1988) disclosed a seismic source having an electro-acoustic transducer connected to a set of capacitors. A high voltage power supply provided power to the capacitors, and the discharge produced an acoustic pulse through a transducer in a liquid medium to generate seismic waves.

U.S. Pat. Nos. 4,850,449 to Cheung (1989) and 5,005,665 to Cheung (1991) disclosed a seismic vibrator driven with piezoelectric transducers to produce improved signal resolution at higher frequencies than hydraulic or pneumatic vibrators. The piezoelectric vibrators could be used at the earth surface, within an open borehole, or when buried below the earth surface. A conventional power source such as an electric generator supplied power which was then amplified and provided to piezoelectric vibrators within a baseplate.

Conventional seismic sources are limited by the power sources and the deliverability of such power to the target mass. Conventional capacitor banks provide relatively low storage density for certain power requirements. Accordingly, a need exists for an improved apparatus for storing and discharging large amounts of energy suitable for use as a seismic energy source. The apparatus should be portable, should be capable of generating large quantities of seismic source energy, and should be capable of generating a signal which can be modified to address different conditions and applications.

SUMMARY OF THE INVENTION

The invention provides an apparatus for transmitting energy to a selected mass. The invention comprises a portable base, a pulsed generator engaged with said base for storing energy and for discharging said energy in a form which provides a signal, and a converter engaged with said pulsed generator for transmitting said energy to the selected mass.

In different embodiments of the invention, the pulsed generator can comprise a compensated pulsed alternator, a power means can be engaged to recharge the pulsed generator, and a controller can be engaged with the pulsed generator to selectively manage the energy discharge. The controller can pulse the energy discharge at a selected frequency, can manage the energy discharge rate, and can control the operation of more than one pulsed generator.

In another embodiment of the invention, the apparatus can selectively discharge energy to generate a seismic source signal. A compensated pulsed alternator is attached to the portable base for storing energy and for selectively discharging the energy in a form representing a signal, a power means recharges the compensated pulsed alternator, and a transducer is engaged with the compensated pulsed alternator for transmitting the energy to generate the seismic source signal.

DESCRIPTION OF THE PREFERRED EMBODIMENTS

Figure 1:
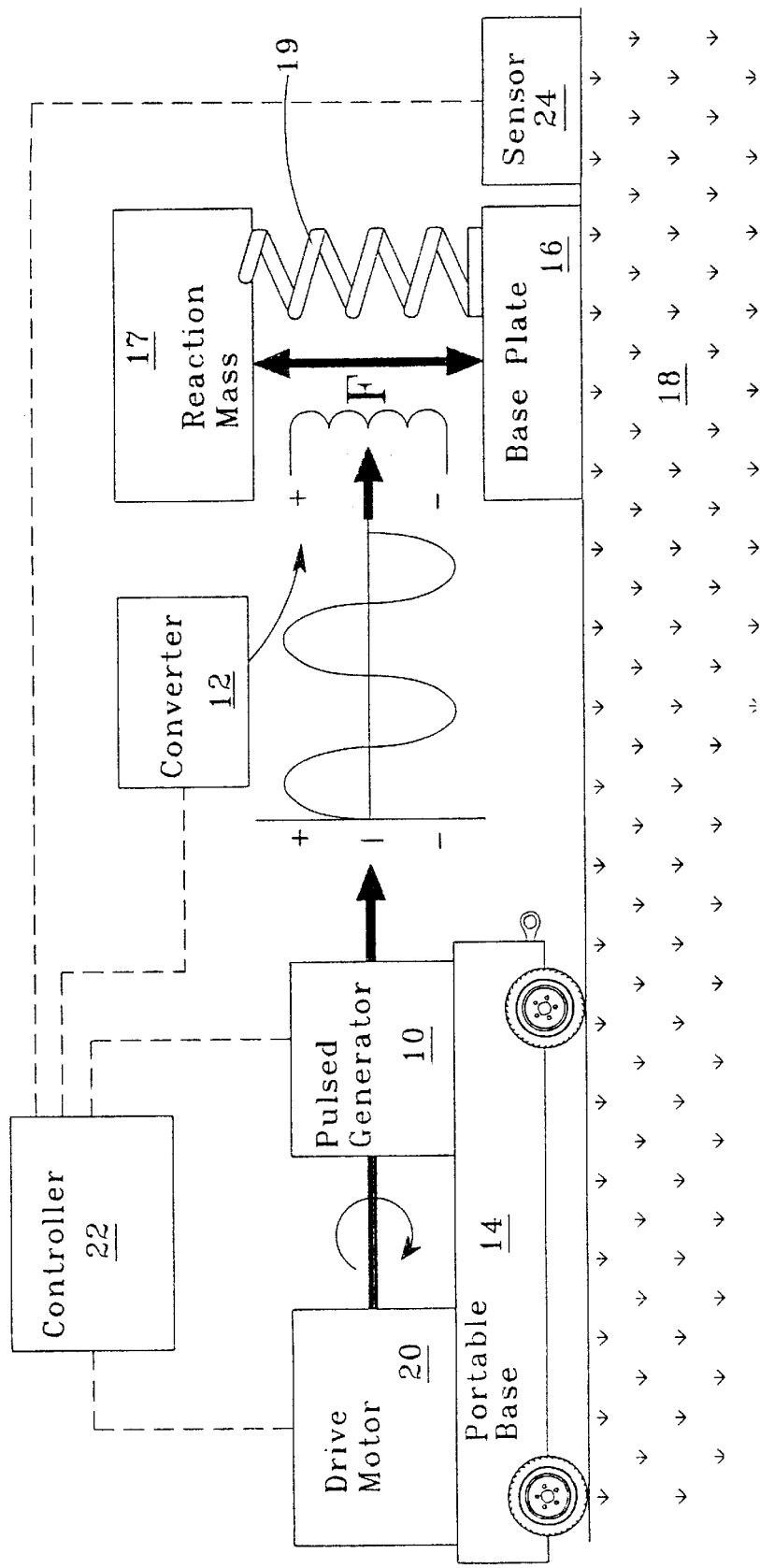
FIG. 1 illustrates a schematic diagram of a pulsed generator engaged with a transducer for transmitting energy to a selected mass.

The invention provides a high-powered pulsed generator as an energy storage mechanism and signal generator. As used herein, the term "pulsed generator" includes homopolar generators, compensated pulsed generators, and other forms of pulsed generators. The power from a pulsed generator may drive one or more converters such as conventional electromagnetic or electromechanical transducers to produce force levels necessary to vibrate large masses. A pulsed generator provides multiple functions of storing energy and of discharging such energy. The form of the energy discharged through a converter can generate a signal useful as a seismic source signal or other desirable signal source.

One form of pulsed generator uses passive compensation where a continuous conducting shield is at rest with respect to the field excitation. The static exciting field diffuses through the shield and induces a voltage in the spinning armatures. The alternator may include a stationary, rotating, or counter-rotating compensating coil, and numerous configurations of such pulsed generator devices exist.

One embodiment of the invention uses compensated pulsed alternators as the pulsed generator because such devices can be designed to produce hundreds of pulses per second or to produce a single pulse similar to a homopolar generator. Pulsed generators can be operated in series or in parallel. The invention is particularly suited for seismic exploration but is also applicable to applications involving shock and vibration testing and vibration cancellation. As used herein for land based operations, the term "soil" includes all topsoil and rock defining the surface and sub-surface geology in a particular location. The term "water" means all applications having water as a mass for transmitting an acoustic wave or other seismic energy source, and includes open water, marshes, tidal regions, rivers, estuaries, and man-made impoundments.

Referring to FIG. 1, a schematic diagram for one embodiment of the invention is illustrated. A pulsed generator such as compulsator 10 is illustrated as being engaged with a converter shown as transducer 12. Transducer 12 converts the energy discharged from compulsator 10 into an energy form capable of transmission to the baseplate 16. Base 14 supports compulsator 10 and is preferably portable to permit the transport of compulsator 10 into different locations. In another embodiment of the invention, base 14 can be attached to a receiving portion of compulsator 10, while another remotely located portion of compulsator 10 identified as a power transmission portion is fixed in a stationary position. Transducer 12 is positioned between reaction mass 17 and baseplate 16 which is in contact with a selected mass 18 to be vibrated. Mass 18 comprises any mass for receiving the energy discharged by the invention and includes masses such as soil, water, rock, structures or other material for receiving energy from the invention. Spring 19 is attached between reaction mass 17 and baseplate 16. The mechanical properties of spring 19 and other conventional components can be varied to achieve desired mechanical behavior for an aggregate spring-mass system.

Drive motor 20 provides energy to recharge compulsator 10 after energy has been discharged from compulsator 10, and controller 22 can be engaged with compulsator 10 to manage the energy discharge and recharge. Sensor 24 can detect the response of mass 18 to the transmitted energy, and can generate a signal for transmission to controller 22. Using input from sensor 24, controller 22 may dynamically modify the output of compulsator 10 and the operation of transducer 12 to produce the desired signal characteristics at mass 18.

In one application of the invention to seismic exploration, transducer 12 comprises an electromagnetic transducer in contact with masses 16 and 18 for transmitting energy to subsurface geologic formations. The discharged energy comprises the physical work that the system is capable of doing in changing from one state to another state, and further includes the signal representing the form of energy transmitted. The energy signal transmitted through a converter such as transducer 12 can be defined by the frequency, phase, amplitude, and the duration of the energy transmission.

Compulsator 10 uniquely comprises a high power electric storage device and signal shape generator suitable for transmitting energy to baseplate mass 16, reaction mass 17, and selected or target mass 18. Compulsator 10 can comprise an electric generator having one or more phases which produce an alternating current, and this current is transmitted over the period represented by the discharge of energy from compulsator 10. The form of the energy signal discharged from compulsator 10 can be replicated with precision to provide a consistent energy signal to mass 18, and can further be regulated by controller 22 as described below. In operation, compulsator 10 and transducer 12 cooperate to "transmit" energy to the selected mass. The transmission of such energy includes several different functions including the creation of a disturbance to propagate through the medium defined by the mass, the conveyance of energy from one medium to another, and the conveyance of a signal.

Compulsator 10 is capable of storing one thousand times more energy in less weight and space than electrical capacitor banks conventionally used in certain geophysical exploration systems. Consequently, the energy density of compulsator 10 is very high, as significant amounts of energy are stored per unit volume of space. In addition, pulsed generators produce very high current of long duration and relatively low voltage compared to the high electric potential of short duration delivered by capacitor based energy storage systems.

Homopolar generators store energy in the inertial form of a spinning rotor or flywheel. Electrical contacts such as brushes slide at high speed on the outer periphery and axial shaft of the rotor to collect the generated current. Homopolar generators were based on the application that inertial energy would be stored in the rotor/flywheel as the rotational velocity of the rotor/flywheel was increased. A pulsed generator converts inertial energy into electric energy which is dissipated in the form of heat and work by a converter such as transducer 12. As current begins to flow through the rotor and brushes, Lorenz forces decelerate the rotor and the stored kinetic energy is converted to one or more electric pulses.

Solid copper-graphite brushes have been developed to conduct electrical currents ranging up to hundreds of thousands of amps. Compulsators have been developed with a power density above 1000 kW/kg. Pulsed generators have been used to weld metal, power solid state lasers, and fire electromagnetic guns. Other applications include simulation of micro-meteorites impacting space vehicles, sintering operations, hypervelocity spraying of dense metal coatings, and the ignition of lean mixtures in automobile engines.

The construction of various compulsators and compulsator improvements is described by U.S. Pat. Nos. 4,200,831 to Weldon et al. (1980), in 4,841,217 to Weldon et al. (1989), in 4,858,304 to Weldon et al. (1989), in 4,935,708 to Weldon et al. (1990), in 5,530,309 to Weldon (1996), the disclosures of which are incorporated herein by reference, and by other sources.

Pulse generators are commercially available from Parker Kinetic Designs, Inc. of Austin, Tex., and are available in representative sizes ranging between 6.7 megajoules ("MJ") at 1.5 MA and 60 MJ at 1.5 MA. A 10 MJ homopolar generator has an effective capacitance of 2,000 farads, a peak discharge current of 1,500,000 amps, and maximum terminal voltage of 100 volts DC. A 60 MJ device has equivalent series capacitance of 333 farads, equivalent parallel capacitance of 12,000 farads, peak discharge current of 9,000,000 amps, and maximum open terminal voltage of 600 volts DC. A 60 MJ device comprises six pulsed power supplies which can be connected to a common bus system to furnish the capability to interconnect individual generators and to form various parallel and series combinations. Drive motor power is provided by a common 2400 horsepower high pressure hydraulic system.

Because compulsator 10 stores energy in a rotating mechanical system, the rotational portions slow down as energy is extracted unless the rotational velocity of compulsator 10 is maintained by external means. In a typical compulsator application, electric or hydraulically powered motors 20 provide the energy to maintain the rotational velocity of compulsator 10. The present invention contemplates that the rotational velocity of compulsator 10 is allowed to slow down to change the frequency of the output alternating current. This feature of the invention permits the signal produced by compulsator 10 to be controlled provided that compulsator 10 is slowed down at the same rate and under the same operating conditions. If these operating conditions are consistent, compulsator 10 will spin down at the same rate each time energy is extracted from compulsator 10 to generate the desired signal.

The slow down time of compulsator 10 depends on the induction characteristics of compulsator 10 and transducers 12 activated by compulsator 10. These induction characteristics can be designed to achieve the desired linear or non-linear frequency sweeps and power delivered to various portions of the frequency spectrum. Precise control of the initiation and termination of energy extraction is controlled by system electronics and sensors. At the end of the sweep, the rotational velocity of compulsator 10 is reduced. Energy is transferred to compulsator 10 by an electric or hydraulic driven motor 20 which restores the rotational velocity of compulsator 10.

The invention provides flexibility in the design of transducers not furnished by hydraulic actuators. Multiple hydraulic actuators cannot drive a single baseplate under the control of a single controller. Each actuator in a baseplate requires a devoted controller collectively controlled by a master controller. The present invention permits a single controller to operate multiple transducers within a baseplate, thereby providing improved operational control.

For seismic exploration applications, one or more electromagnetic transducers 12 convert the alternating current produced by compulsator 10 into sinusoidal forces acting against the soil. Geophysical land based vibrators exert up to forty thousand pounds of force to the center of baseplate 16. Compulsator 10 has sufficient power to drive multiple transducers 12 simultaneously to distribute the generated forces over the entirety of baseplate 16 in contact with soil or water or other mass 18. By distributing the vibrational forces over a larger area, the force per unit area and corresponding mechanical stress is reduced. If forty thousand pounds of force is distributed evenly over a baseplate 16 by eight transducers each producing five thousand pounds of force, the force per square foot is correspondingly reduced by a factor of eight. Such reductions in force per unit area simplify baseplate construction and the mechanical linkages typically driving baseplate 16. Such reductions in force per area are particularly useful in marine applications where the medium is practically uniform, and where the baseplate strength and weight are critical to the efficient projection of acoustic energy into the water medium. The character of energy discharged into soil or water as a seismic source signal can be recorded by sensor 24 to aid matched filter or correlation processing of recorded receiver sensor data.

The force distribution capabilities of the invention reduces the degree of flexing of baseplate 16, and further permits larger cumulative forces to be used in vibrating baseplate 16. By providing the capability of distributing force over a greater area, the total vibrational force can be increased. This feature of the invention permits a greater overall signal power for penetration of subsurface formations, and further permits greater overall signal control. The larger energy band provides the opportunity to selectively emphasize different components of the signal at different times during the application of the vibrational forces. This permits the signal to be tuned to the physical properties of the soil, water or other mass 18 being contacted. For hard rock applications or for shallow target zones, a shorter duration and higher frequency pulse may be preferred. For tidal marsh or bog areas or for deep target zones, a longer and lower frequency pulse may be preferred.

A specific application of the invention to a marine transducer is described as follows. Assume the seismic source is required to produce a pressure of 3160 Pascals (Pa) measured one meter from the source. If the desired source has a surface area of eight square meters and was treated as a simple source, a force of about 320,000 N would be required of transducers acting on the surface. Such a system requires approximately one megajoule of energy to be stored in the pulse generator (assuming the electromagnetic transducers are 10% efficient) to produce a 10second signal. As described above, available compulsators store more than 100 times the power required for the hypothetical source described above.

The application of a pulsed generator such as compulsator 10 to seismic signal source generation provides unique capabilities not found in conventional seismic source systems. The pulse power provided by compulsator 10 can generate virtually infinite variety of pulse waveforms suitable for conversion into the selected target mass. Controller 22 can manage the waveform of the discharged energy, thereby providing significant wave shape flexibility. A variety of current pulse shapes can be made in different ways such as by adjusting the angle between the magnetic axis of the field coil and the compensating coil, by using a non-uniform or non-symmetrical armature winding, or by adjusting the configuration or position of a compensation winding. Additionally, pulsed generators such as compulsators provide greater energy storage density and greater accessability to energy discharge so that the larger seismic signals can be transmitted and so that the transfer of energy into the selected mass is more efficient.

The invention provides significant flexibility by allowing interactive control over the energy discharged from compulsator 10. Compulsator 10 can comprise two or more pulsed generators such as compensated pulsed generators engaged in parallel or in series. If connected in parallel, the pulsed generators can be alternatively discharged. Such an arrangement would facilitate continuous signal output. While one pulse generator was discharged, another was being charged. Sensor 24 can transmit signals to controller 22 to permit interactive adjustment or modifications by controller 22 over the discharge of energy from compulsator 10. Such adjustment by controller 22 can affect the amplitude, frequency, duration and other parameters of the seismic source signal discharged from compulsator 10 into contact with mass 18.

The invention is applicable to different uses such as in evaluating the response of dams, bridges, buildings and other structures to seismic earth movement. The invention can vibrate the structure or soil proximate to the structure, and various measurements can be taken on the structure. Vibrational movement of a building or other structure can be detected after the application of the discharged energy, and signal attenuation can be monitored at different points within or proximate to the structure. In this manner, the invention provides a unique tool for providing information regarding a structures performance in response to larger forces such as might be created by earth movement or artificial explosions.

Furthermore, signals from sensors 24 attached to a mass such as a structure, and transmitted to controller 22 which can extract energy from pulse generator 10 to have characteristics such that conversion by transducers 12 will cancel undesired vibrations in the structure. This use of the invention can accomplish the beneficial function of vibration cancellation useful in buildings, bridges and other structures.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for transmitting energy to a selected mass, comprising:
    a portable base;
    a compulsated pulsed generator (engaged with) attached to said base for storing energy and for discharging said energy in a form which provides a signal; and
    a converter connected to said pulsed generator for transmitting said energy to the selected mass.

2. An apparatus as recited in claim 1, further comprising a power means connected to said pulsed generator for recharging said pulsed generator after the energy has been discharged.

3. An apparatus as recited in claim 1, further comprising a controller connected to said pulsed generator for selectively managing said energy discharge from said pulsed generator to said converter.

4. An apparatus as recited in claim 3, wherein said controller pulses said energy discharge at a selected frequency.

5. An apparatus as recited in claim 3, wherein said controller is manages the discharge rate of the energy.

6. An apparatus as recited in claim 1, wherein said pulsed generator discharges substantially all of said stored energy.

7. An apparatus as recited in claim 1, further comprising at least two pulsed generators cooperatively discharging said energy to said converter.

8. An apparatus as recited in claim 1, further comprising a sensor attached to the selected mass for detecting a portion of said energy after said energy has been transmitted to the selected mass.

9. An apparatus as recited in claim 1, wherein the selected mass comprises soil, and wherein said converter comprises an electromagnetic transducer.

10. An apparatus as recited in claim 1, wherein the selected mass comprises water, and wherein said base comprises a vessel.

11. A seismic exploration apparatus for storing energy and for selectively discharging the stored energy to a selected mass, comprising:
    a portable base which can be positioned proximate to the selected mass;
    a pulsed generator attached to said base for storing energy and for selectively discharging said energy in a form representing a signal;
    a converter engaged with said pulsed generator for transmitting said energy to the selected mass; and
    a controller connected to said pulsed generator for selectively managing transmission of said energy to the selected mass.

12. An apparatus as recited in claim 11, further comprising a power means connected to said pulsed generator for recharging said pulsed generator after the energy has been discharged.

13. An apparatus as recited in claim 11, further comprising a sensor attached to the selected mass for detecting reflections of said energy after said energy has been transmitted to and reflected from the selected mass.

14. An apparatus as recited in claim 13, wherein said sensor generates a signal for transmission to said controller, and wherein said controller adjusts said pulsed generator transmission of said energy in response to the signal from said sensor.

15. A seismic exploration apparatus for selectively discharging energy to generate a seismic source signal, comprising:
    a portable base;
    a compensated pulsed alternator attached to said base for storing energy and for selectively discharging said energy in a form representing a signal;
    a power means for recharging said compensated pulsed alternator after said energy has been discharged; and
    a transducer connected to said compensated pulsed alternator for transmitting said energy to generate the seismic source signal.

16. An apparatus as recited in claim 15, further comprising a controller connected to said compensated pulsed generator for selectively managing transmission of said energy.

17. An apparatus as recited in claim 15, wherein at least two compensated pulsed alternators selectively discharge said energy.

18. An apparatus as recited in claim 16, wherein at least two compensated pulsed alternators are managed by said controller to alternately discharge said energy.

* * * * *